LEO E. HAKKA
GEORGE L. BATA
JOHN E. HAZELL

INVENTOR.

BY William G. Hopley

United States Patent Office 3,674,439
Patented July 4, 1972

3,674,439
DETECTION DEVICE FOR GAS MIXTURES
Leo E. Hakka and George L. Bata, Montreal, Quebec, and John E. Hazell, Rosemere, Quebec, Canada, assignors to Union Carbide Canada Limited, Toronto, Ontario, Canada
Filed July 10, 1970, Ser. No. 53,763
Int. Cl. G01n 31/06; G08b 21/00
U.S. Cl. 23—254 R                             14 Claims

ABSTRACT OF THE DISCLOSURE

A device for detecting a component in a gas mixture consists of a strip of two layers laminated together, one layer being a better solvent for the gas component than the other and each being effectively a non-solvent for the other components in the mixture, a support means for securing one end of the strip and a recording means at the free end of the strip for recording a deflection in the strip due to the lateral expansion of the solvent layer with respect to the non-solvent layer. Also described in the embodiment wherein the ratio of two components in the gas mixture may be determined by means of a device wherein the strip consists of two layers one of which is a solvent for one component and the other layer is a solvent for the second component.

---

This invention relates to a device for detecting components such as hydrocarbons or moisture in a gas mixture such as air. More particularly, it relates to a detection device consisting of a thin flexible strip comprising two layers of different material laminated together, one of such layers being a better solvent for the component being detected than the other. The swelling of the solvent layer in the presence of the component will cause the strip to deflect in proportion to the concentration of said component, thereby giving a quantitative determination of the presence of the component.

Various devices for detecting components in gas mixtures are known, particularly for detecting leaks in hydrocarbon gas pipelines. These previously known devices are generally more complex and expensive than the applicant's device.

The device described by the applicant is simple, relatively inexpensive and easily adaptable to the detection of various gases or vapours, depending upon the materials used in the lamination of the strip.

The present invention therefore discloses a device for detecting a component or a group of similar components in a gaseous mixture which comprises a strip rigidly secured at one end to a support means and freely movable at the other end, said strip consisting of two layers laminated together each layer being of a different flexible material, the first layer being a better solvent for said component than the second layer and both layers being effectively non-solvents for the other components of the gaseous mixture whereby said solvent layer expands volumetrically in the presence of the said component thus deflecting the strip in the direction of the said second layer within a predetermined range, and a means functionally connected to the free end of said strip for recording said deflection.

In accordance with the general chemical principle that like dissolves like, the material which will swell during sensing can be chosen to react to a wide or narrow range of chemicals. For instance, if it is desirable to sense only non-polar compounds such as hydrocarbons, the active portion of the laminate would be made of a non-polar hydrocarbon type of polymer such as polyethylene, polypropylene, polyisobutylene, polyisoprene, polystyrene etc., and their various copolymers. The inactive part of the laminate would be a non-solvent material for hydrocarbons, such as a metal, paper, phenolic, silicone or poly (ethylene oxide). In general, a very broad range of materials may be detected, either selectively or indiscriminately by employing suitable materials, their varying copolymers, or even their mixtures for the active component of the laminate. In practice, if the sensing element is subjected to temperature variations, the thermal coefficients of expansion of the laminating materials should be equal to eliminate this effect from the observed movement. An easy method of accomplishing this is to use cured and uncured polymer for the two materials since the crosslinked polymer does not swell nearly as much as the uncrosslinked material, though their thermal coefficient of expansion should be reasonably similar.

The conversion of the sensing element deflection upon swelling may be utilized in a great many ways to indicate the presence of a compound or its concentration. One method is to have the laminate complete an electrical circuit by attaching an electrical contact to the sensor tip so that it will touch another upon curling. Another is to attach a mercury switch to the laminate. Another is to attach a mirror onto the element so that it will reflect a beam of light onto a scale, the position of the light spot being proportional to the concentration of detected matter. Yet another is to mount a scale adjacent to the laminated strip so that concentration may be read off visually. Thus, by suitable configuration, the sensing element may function as an on-off relay or a chemical concentration gauge.

Figure 1:
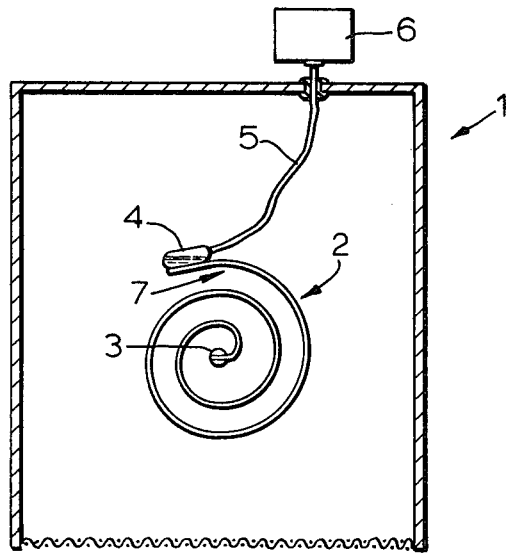
FIG. 1 is a schematic diagram of one embodiment of the detection device of this invention.

In the embodiment shown in FIG. 1 a support means 1 consisting generally of a backing plate has a spirally wound flexible strip 2 mounted thereon by being rigidly secured at one of a pin 3 on the support means. The other end of strip 2 is secured to a mercury switch 4 which is flexibly connected in the electrical circuit 5. An alarm 6 is connected in the electrical circuit when the mercury switch 4 is closed by the action of strip 2.

Strip 2 consists of a laminate of two different materials such as polyethylene and cellophane. When such a detection device is placed in an area for detecting the presence of hydrocarbon vapours in the air the polyethylene portion 7 of the strip expands in the presence of the hydrocarbon due to the dissolution of hydrocarbon in the polyethylene. This swelling causes the spirally wound strip to deflect in such a manner that the end of the strip secured to the mercury switch 4 causes such switch to close thereby completing the electrical circuit 5 and activating the alarm.

EXAMPLE 1

A device as described above using a strip which is 1" wide and 7" long consisting of a laminate of 1.5 mil low density polyethylene in the outer layer of the spiral and 1 mil cellophane was used to detect the presence of natural gas at a temperature of 22° C. The angle between the tangents of the two ends of the strip changed by 135° going from vacuum to one atmosphere of commercially supplied natural gas.

EXAMPLE 2

A device as described above was used to detect the presence of water vapour in the air using a laminated strip which is ¾" wide and 3½" long, consisting of a layer of 1.5 mil polyethylene and a layer of 1.5 mil kraft paper. The paper curled through an angle of 90° when the partial pressure of water vapour was increased from about 0 to 20 mm. mercury. The time required to attain this deflection was about 1 minute. In this example, the kraft paper constitutes the outer layer of the spiral which constitutes the solvent for the water.

EXAMPLE 3

A device as described above was used to detect the presence of n-heptane vapour in an evacuated container. The strip used in the device was .4" wide and 1.7" long and consists of a laminate of 2.5 mil polyethylene on 220 KST cellophane. The polyethylene layer acts as the solvent for the n-heptane. N-heptane was introduced into the flask until the pressures increased from 0 to 150 mm. mercury. In response to the heptane vapour the strip curled to an angle of 900° within a period of from 10–20 seconds from time of introduction of the heptane. The curling of the strip was due to the swelling of the polyethylene layer in the presence of the heptane.

EXAMPLE 4

Under conditions similar to those described in Example 3 a device was used consisting of a strip which is 5" wide and 2.4" long. The strip consisted of a layer of 2.5 mil polyethylene and 1.5 mil Mylar laminate. The strip curled to an angle of 540° within a period of 10–20 seconds from the time of introduction of the heptane vapour.

It must be understood that the detecting device as described herein can also be used to detect the ratio of two dissimilar components in a gas mixture by using a detection device wherein one layer constitutes the solvent for the one component and the second layer constitutes the solvent for the other component. Deflection will be due to the greater swelling of one strip over the other due to the higher proportion of that component which is soluble in the more swollen strip. Such an embodiment would be practical in the case where the presence of the two components are already known and their quantitative amounts need not be considered. This ratio sensing device as described would only serve to determine the ratio of one component over the other. It must be understood of course that the gas mixture must be free of other components which would effect the solubility of either strip of the detector.

EXAMPLE 5

A strip mounted as described with reference to FIG. 2 and which is 2" long by ½" wide consisted of a layer of 1.5 mil polyethylene laminated to a layer of 1.5 mil kraft paper. The detection device using this strip was placed under vacuum and then subjected to water vapour at a pressure of 20 mm. Hg. The strip curled 45° after approximately 1 minute with the kraft paper side of the laminate constituting the outside of the curl. The water vapour was then removed from the system at a pressure of approximately 150 mm. Hg. The strip curled rapidly through an angle of 720° with polyethylene strip constituting the outside of the curl.

In the presence of both dissimilar vapours simultaneously a predetermined equilibrium position for the laminate can be made for the particular system involved and the imbalance of the ratio of the components would cause deflection in the detector strip in one or the other direction.

Figure 2:
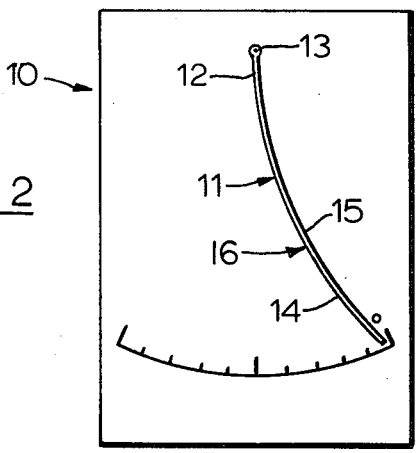
FIG. 2 is a schematic diagram of another embodiment of this invention.

In FIG. 2 another embodiment of the device is shown. The device consists of a support means 10 having a strip 11 of flexible material mounted thereon by being rigidly secured at one end 12 to the support means by pin 13. The strip is suspended from the pin with the lower end of the strip 14 hanging free. A graduated scale is marked on the support means behind the free end 14 of the strip 11. When the strip is caused to deflect by the presence of the component which causes layer 15 of strip 11 to swell relatively to the adjoining layer, the lower end 14 of the strip will indicate the degree of deflection in convenient units for a quantitative determination of the component. In the embodiment shown this scale is given in a percentage of relative humidity. For such a humidity gauge, the solvent layer 15 may be of poly(ethylene) oxide. Layer 16 may be of polyethylene.

Figure 3:
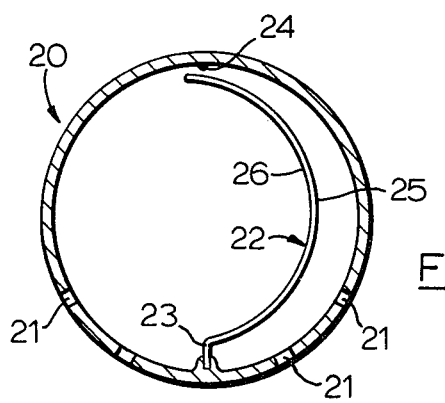
FIG. 3 is a schematic diagram of a cross-section of a conduit containing another embodiment of this invention.

In FIG. 3, the embodiment shown consists of an insulated conduit 20 having a plurality of holes 21 positioned in the walls of the conduit for permitting samples of the gaseous mixture to enter the conduit. A flexible strip 22 is mounted laterally in the conduit with one end 23 rigidly secured to the wall of the conduit and connected in an electrical circuit (not shown). The other end of the electrical circuit 24 is located in the opposite side of the conduit. The strip consists of a layer of electrically conducting material 25 such as aluminum or copper foil and the other layer of the strip 26 may be a hydrocarbon polymer such as polyethylene. When n-heptane vapours are introduced into the conduit through holes 21 the polyethylene layer expands due to its characteristic of being a solvent for n-heptane. This expansion causes the conducting side of the strip 25 to contact the electrical circuit contact 24 to complete an electrical circuit which may include an alarm system or warning light.

We claim:

1. A device for detecting a component in a gaseous mixture which comprises: a strip rigidly secured at one end to a support means and freely moveable at the other end, said strip consisting of two layers laminated together, each layer being of a different flexible material, the first layer material being a better solvent for said component than the second layer material and both layer materials being effectively non-solvents for the other components of the gaseous mixture, whereby said first layer material is laterally expandable in the presence of the said component thus deflecting the strip in the direction of said second layer material within a predetermined range, and a means functionally connected to the free end of said strip for measuring said deflection.

2. A device as claimed in claim 1 wherein said component is a hydrocarbon and wherein said first layer material is a hydrocarbon polymer.

3. A device as claimed in claim 2 wherein said first layer material is an uncrosslinked hydrocarbon polymer selected from the group consisting of polyolefin and polydiene and said second layer material is a crosslinked hydrocarbon polymer selected from the group consisting of polyolefin and polydiene.

4. A device as claimed in claim 2 wherein said first layer material is one selected from the group consisting of polyolefin and polydiene.

5. A device as claimed in claim 4 wherein said second layer material is one selected from the group consisting of cellophane, aluminum foil and copper foil.

6. A device for detecting moisture in a gaseous mixture which comprises a strip rigidly secured at one end to a support means and freely removable at the other end, said strip consisting of two layers laminated together, each layer being of a different flexible material, the first layer material being a better solvent for water than the second layer material, both said layers being effectively non-solvents for the other components of the gaseous mixture whereby said first layer is laterally expandable in the presence of the moisture thus deflecting the strip in the direction of the said second layer within a predetermined range, and a means functionally connected to the free end of said strip for measuring said deflection.

7. A device as claimed in claim 6 wherein said first layer material is one selected from the group consisting of polyalkylene oxide, cellulose and a cellulose derivative and said second material is one selected from the group consisting of polyolefin and polydiene.

8. A device as claimed in claim 6 wherein said support means is an insulated conduit having a plurality of holes positioned in the walls of said conduit for permitting entry of said gas mixture, said strip rigidly secured at one end to the inner wall of said conduit and communicating with a first lead of an electrical circuit, a second lead in said circuit mounted in the inner wall adjacent the free end of the said strip whereby the deflection of said strip in the presence of said component causes said free end to contact said second lead thus completing the electrical circuit.

9. A device as claimed in claim 6 wherein said first layer material is poly(ethylene oxide) and said second layer material is polyethylene.

10. A device as claimed in claim 6 wherein said strip is spirally wound on the support means and said means for measuring said deflection comprising an alarm circuit functionally connected to the free end of said strip.

11. A device as claimed in claim 6 wherein said means for measuring said deflection comprises a scale mounted on said support means behind the free end of said strip whereby a deflection in said strip may be visually calibrated.

12. A device for detecting the ratio of concentrations of two vapour components in a gaseous mixture which comprises a strip rigidly secured at one end to a support means and freely moveable at the other end, said strip consisting of two layers laminated together, each layer being of a different flexible material such that one flexible material is a solvent for only one of said components of the mixture, the other flexible material being a solvent for the second component, the said flexible materials being expandable upon dissolving the respective component thus tending to deflect said strip, the free end of the strip having a functionally connected means for measuring said deflection.

13. A device as claimed in claim 12 in which said strip is a laminate of poly(alkylene)oxide and a polyolefin or polydiene.

14. A device as claimed in claim 12 in which said strip is a laminate of a cellulosic material and a polyolefin or polydiene.

References Cited

UNITED STATES PATENTS 2,708,896   5/1955   Smith et al. ____ 23—253 TP X

OTHER REFERENCES

Beatty et al.: Rubber World, November 1954, pp. 232, 233.

MORRIS O. WOLK, Primary Examiner

R. M. REESE, Assistant Examiner

U.S. Cl. X.R.

23—232 R; 340—237 R